United States Patent [19]

Hiramatsu

[11] Patent Number: 5,563,863
[45] Date of Patent: Oct. 8, 1996

[54] INFORMATION REPRODUCING METHOD AND APPARATUS FOR REPRODUCING DIGITAL INFORMATION BY DETERMINING THE INFORMATION IN MULTIPLE BIT UNITS BASED ON BINARIZER OUTPUT SIGNALS

[75] Inventor: Makoto Hiramatsu, Kawasaki, Japan

[73] Assignee: Canon Kabushiki Kaisha, Tokyo, Japan

[21] Appl. No.: 304,181

[22] Filed: Sep. 12, 1994

[30] Foreign Application Priority Data

Sep. 16, 1993 [JP] Japan .................... 5-252121

[51] Int. Cl.6 .................................... G11B 7/00
[52] U.S. Cl. .................... 369/59; 369/48; 369/124
[58] Field of Search ................. 369/48, 54, 58, 369/59, 111, 124; 360/46

[56] References Cited

U.S. PATENT DOCUMENTS

| | | | |
|---|---|---|---|
| 4,626,933 | 12/1986 | Bucska et al. | 360/46 X |
| 4,908,722 | 3/1990 | Sonobe | 360/46 |
| 5,029,023 | 7/1991 | Bearden et al. . | |
| 5,430,582 | 7/1995 | Hayashi | 360/46 X |
| 5,436,771 | 7/1995 | Yun | 360/46 X |

OTHER PUBLICATIONS

Patent Abstracts of Japan, vol. 17, No. 456, E1418, Aug. 20, 1993, & JP5–102851.

Primary Examiner—W. R. Young
Attorney, Agent, or Firm—Fitzpatrick, Cella, Harper & Scinto

[57] ABSTRACT

An information reproducing apparatus for reproducing digital information recorded in a recording medium. The apparatus includes a first binarizing unit for binarizing a reproduction signal read out of the recording medium, a differentiating unit for differentiating the reproduction signal read out of the recording medium, a second binarizing unit for binarizing a signal obtained by differentiating the reproduction signal in the differentiating unit, and a determining unit for determining the digital information in units of multiple bits, based on output signals from the first and second binarizing units.

8 Claims, 8 Drawing Sheets

FIG. 1 PRIOR ART

FIG. 2A PRIOR ART — RECORDING DATA 1 1 0 0 0 1 1 0 1 1 0 0

FIG. 2B PRIOR ART — REPRODUCTION DATA (SLICE LEVEL)

FIG. 2C PRIOR ART — BINARY SIGNAL

FIG. 2D PRIOR ART — DATA CLOCK

FIG. 2E PRIOR ART — REPRODUCTION DATA

| BINARY SIGNAL S2 | H | H | L | L |
|---|---|---|---|---|
| BINARY SIGNAL S1 | H | L | — | — |
| BINARY SIGNAL S3 | — | — | H | L |
| DATA | 1,1 | 0,0 | 0,1 | 1,0 |

INFORMATION REPRODUCING METHOD AND APPARATUS FOR REPRODUCING DIGITAL INFORMATION BY DETERMINING THE INFORMATION IN MULTIPLE BIT UNITS BASED ON BINARIZER OUTPUT SIGNALS

BACKGROUND OF THE INVENTION

1. Field of the Invention

The present invention relates to an information reproducing apparatus for reproducing digital information recorded in a recording medium.

2. Related Background Art

Figure 1:
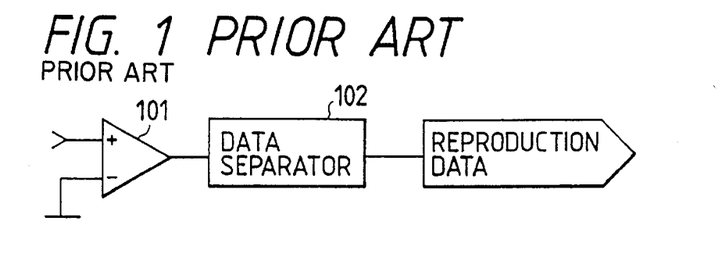
FIG. 1 is a drawing to schematically show the structure of a conventional information reproducing apparatus.

FIG. 1 is a drawing to schematically show a conventional information reproducing apparatus. In the drawing a reproduction signal is a signal read out of a recording medium such as an optical disk, which is compared with a predetermined slice level in a comparator 101 to produce a binary signal. The obtained binary signal is output to a data separator 102, where the binary signal is synchronized with a data clock to produce reproduction data.

Figures 2A, 2B:
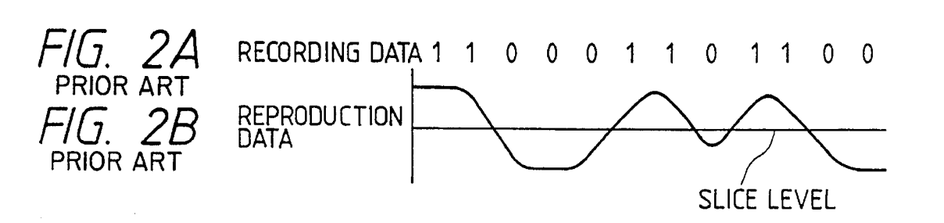
FIGS. 2A to 2E are time charts to illustrate the operation of the apparatus of FIG. 1.
Figure 2C:
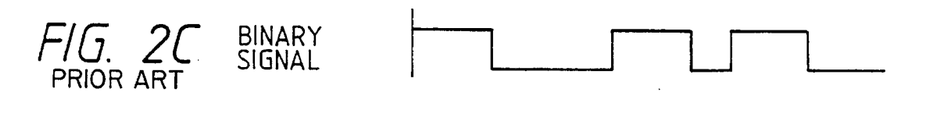
Figure 2D:
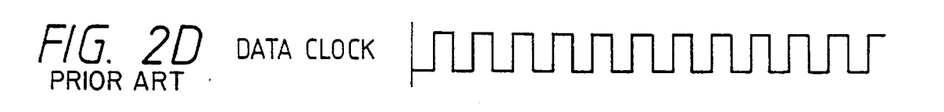
Figure 2E:
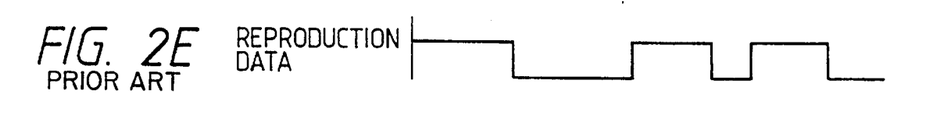

FIGS. 2A to 2E are drawings to show waveforms of the signals in the respective portions in FIG. 1, in which FIG. 2B shows the reproduction signal. It is assumed here that recording data as shown in FIG. 2A has been recorded in the recording medium, and reproduction of the recording data gives the reproduction signal as shown in FIG. 2B. When this reproduction signal is put into the comparator 101 to binarize it with the slice level, the binary signal as shown in FIG. 2C is produced. Further, synchronizing the binary signal with the data clock shown in FIG. 2D in the data separator 102, the reproduction data shown in FIG. 2E can be obtained.

The above, conventional information reproducing apparatus, however, had such a problem that the frequency of the data clock became higher with an increase in density of recorded information or with an increase in transfer rate, which narrowed the width of a detection window (a period of a data clock), reducing the error rate and in turn resulting in failing to assure reliability of information reproduction.

The present invention has been accomplished in view of the above problem, and an object of the present invention is to provide an information reproducing apparatus which is free of a reduction in error rate even with an increase in density of information or with an increase in transfer rate, thus assuring the reliability.

SUMMARY OF THE INVENTION

To achieve the above object, an information reproducing apparatus for reproducing digital information recorded in a recording medium, according to the present invention, comprises first binarizing means for binarizing a reproduction signal read out of the recording medium, differentiating means for differentiating the reproduction signal, second binarizing means for binarizing a signal obtained by differentiating the reproduction signal in the differentiating means, and determining means for determining the digital information in units of multiple bits, based on output signals from the first and second binarizing means.

Also, an information reproducing method for reproducing digital information recorded in a recording medium, according to the present invention, comprises a first binarizing step for binarizing a reproduction signal read out of the recording medium, a step for differentiating the reproduction signal, a second binarizing step for binarizing a signal obtained by the differentiation, and a step for determining the digital information in units of multiple bits, based on signals produced in the first and second binarizing steps. The further detailed structure of the present invention will be apparent in the detailed description.

DETAILED DESCRIPTION OF THE PREFERRED EMBODIMENTS

Figure 3:
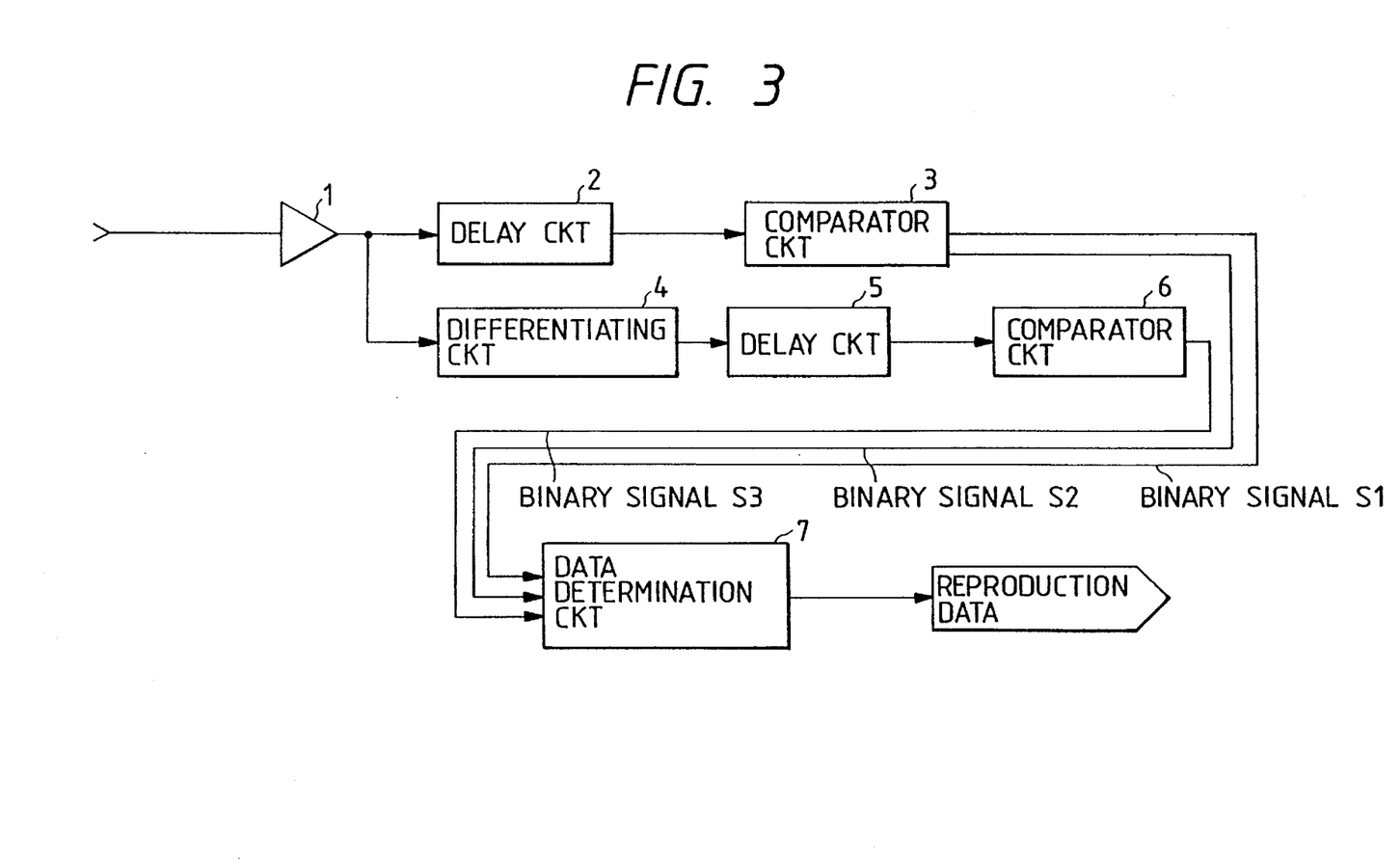
FIG. 3 is a block diagram to show an embodiment of an information reproducing apparatus of the present invention.

Embodiments of the present invention will be described in detail with reference to the accompanying drawings. FIG. 3 is a block diagram to show an embodiment of an information reproducing apparatus of the present invention. In FIG. 3, reference numeral 1 designates a head amplifier for amplifying a reproduction signal read out of a recording medium up to a predetermined amplitude level, and 2 a delay circuit for delaying the reproduction signal from the head amplifier 1 by a predetermined time. Numeral 3 denotes a comparator circuit for producing two binary signals S1, S2, based on an output signal from the delay circuit 2. A specific structure of the comparator circuit 3 will be described later.

Numeral 4 denotes a differentiating circuit for differentiating the reproduction signal from the head amplifier 1, 5 a delay circuit for delaying an output signal from the differentiating circuit 4 by a predetermined time, and 6 a comparator circuit for producing a binary signal S3, based on an output signal from the delay circuit 5. The structure of the comparator circuit 6 will also be detailed later. The delay circuits 2 and 5 are for adjusting a timing so that the two signals put into the comparator circuits 3 and 6 become matched in timing with each other. Further, numeral 7 denotes a data determination circuit for determining the reproduction data, based on the binary signals S1 to S3 produced in the comparator circuits 3 and 6. A specific structure of the data determination circuit 7 will also be detailed later. It should be noted that either one of the delay circuits 2 and 5 can be omitted.

Figure 4:
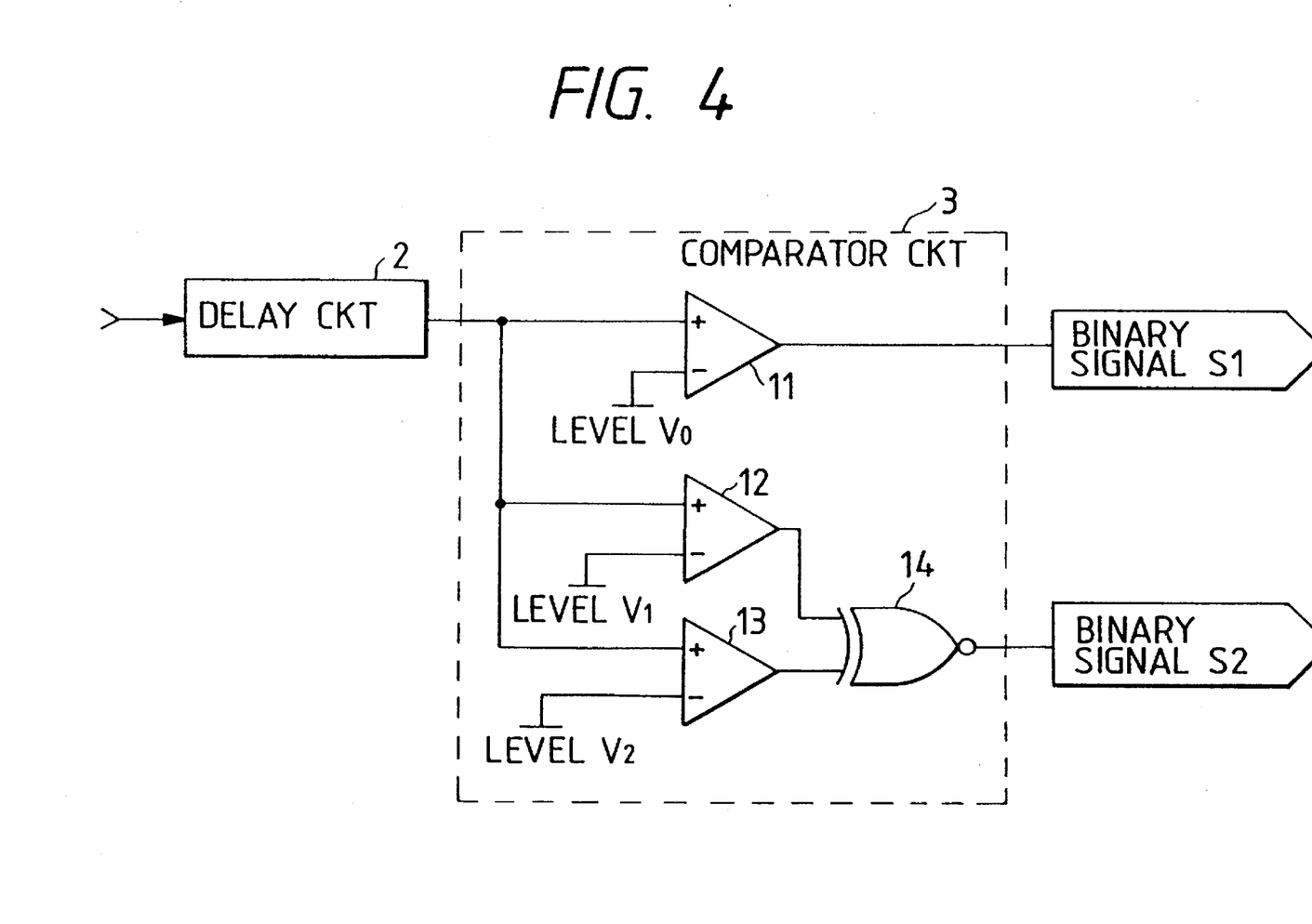
FIG. 4 is a circuit diagram to show a specific example of a comparator circuit 3 in the embodiment of FIG. 3.

FIG. 4 is a circuit diagram to show a specific example of a construction of the comparator circuit 3. In FIGS. 4, 11 to 13 are comparators each for binarizing the reproduction signal. The comparator 11 compares the reproduction signal with a slice level $V_0$ to produce the binary signal S1. In the present embodiment, the slice level $V_0$ is set nearly at an intermediate value of the amplitude of the reproduction signal. The comparator 12 compares the reproduction signal with a slice level $V_1$ while the comparator 13 compares the reproduction signal with a slice level $V_2$, producing respective binary signals. Further, an exclusive NOR circuit (ExNOR circuit) 14 takes an exclusive OR of the two binary signals to produce the binary signal S2. When the recording data is "1, 0" or "0, 1," the binary signal S2 is output as a window pulse (the low level in the present embodiment). As detailed later, the recording data is determined in units of two bits, based on the binary signal S2 and the binary signals S1, S3.

Figure 5:
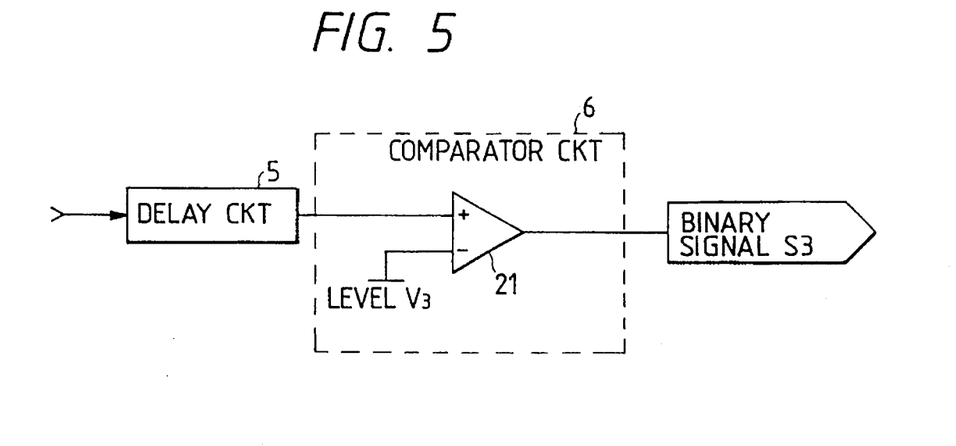
FIG. 5 is a circuit diagram to show a specific example of a comparator circuit 6 in the embodiment of FIG. 3.

FIG. 5 is a circuit diagram to show a specific example of the comparator circuit 6. The comparator circuit 6 is a circuit for binarizing the differential signal from the differentiating circuit 4, in which a comparator 21 compares the differential signal with a slice level $V_3$ to produce the binary signal S3. In the present embodiment, the slice level $V_3$ is set nearly at an intermediate value of the amplitude of the differential signal.

Figure 6A:
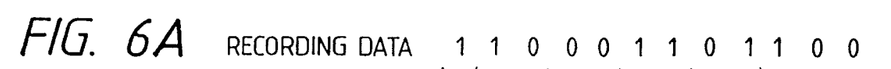
FIGS. 6A to 6I are time charts to show signals in portions in the embodiment of FIG. 3.
Figure 6B:
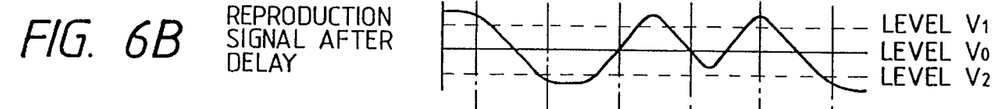
Figure 6C:
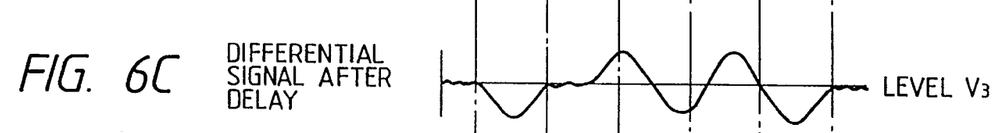

FIGS. 6A to 6I are time charts to show the signals in the portions in the embodiment of FIG. 3. First, FIG. 6A shows the recording data recorded in the recording medium. The recording data is reproduced by an unrepresented reproducing device, the reproduced data is amplified by the head amplifier 1, and the amplified data is delayed by the predetermined time in the delay circuit 2 to produce the reproduction signal as shown in FIG. 6B. Also, the reproduction signal from the head amplifier 1 is differentiated by the differentiating circuit 4, and the differential signal is adjusted in timing in the delay circuit 5 to produce the differential signal as shown in FIG. 6C.

Figure 6D:
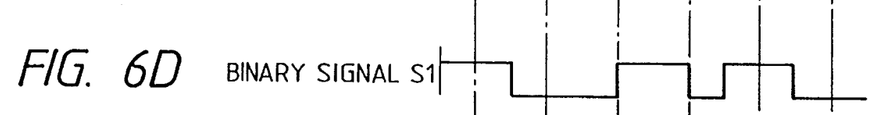

Here, the slice level $V_0$ of the comparator 11 in the comparator circuit 3 is set nearly at the intermediate value of the amplitude of the reproduction signal (FIG. 6B) as described previously, so that the comparator 11 compares the reproduction signal with the slice level $V_0$ to produce the binary signal S1 as shown in FIG. 6D. Assuming that the maximum amplitude of the reproduction signal is ±1, the slice levels $V_1$, $V_2$ of the comparators 12, 13 in the comparator circuit 3 are set to be ±½ as shown in FIG. 6B. Since the amplitude of the reproduction signal varies depending upon frequency characteristics of the reproducing system, the slice levels $V_1$, $V_2$ are preferably adjusted depending thereon.

Figure 6E:
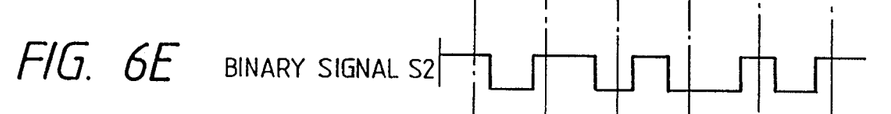
Figure 6F:
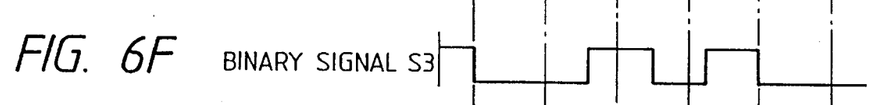

The comparators 12 and 13 binarize the reproduction signal with the above slice levels $V_1$ and $V_2$, and then the ExNOR circuit 14 takes an exclusive OR of the thus binarized signals to produce the binary signal S2 as shown in FIG. 6E. In the comparator circuit 6 the comparator 21 compares the reproduction signal (actually, the differential signal thereof) with the slice level $V_3$ to produce the binary signal S3. The slice level $V_3$ is set at the intermediate value of the amplitude of the differential signal (FIG. 6C) as described previously, so that, binarizing the reproduction signal with the slice level $V_3$ in the comparator 21, the binary signal S3 can be attained as shown in FIG. 6F.

Since the binary signal S1 is obtained by binarizing the reproduction signal with the slice level $V_0$ which is the intermediate value between the maximum and the minimum of the amplitude, it takes the low level with the recording data of "0, 0" but the high level with the recording data of "1, 1," as shown in FIG. 6D. Also, since the binary signal S2 is produced by binarizing the reproduction signal with the two slice levels $V_1$, $V_2$ in the comparator circuit 3 and further taking the exclusive OR thereof in the ExNOR circuit 14 as described previously, with the binary signal S2 being at the high level, bits in the recording data are "0, 1" or "1, 0" before and after it, as shown in FIG. 6E. On the other hand, with the binary signal S2 being at the low level, bits in the recording data are "0, 0" or "1, 1" before and after it. That is, when the recording data is "1, 0" or "0, 1," the binary signal S2 is at the low level; when "1" or "0" continues for two or more bits in the recording data, the binary signal S2 is at the high level. Further, since the binary signal S3 is produced by binarizing the differential signal of the reproduction signal with the slice level $V_3$ which is the intermediate value of the amplitude thereof, the binary signal S3 takes the high level with the recording data of "0, 1" but the low level with the recording data of "1, 0," as shown in FIG. 6F.

Figure 6G:
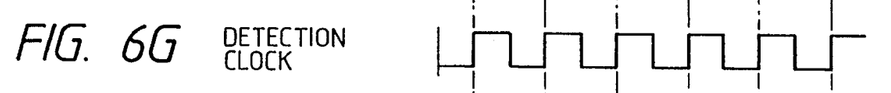
Figure 6H:
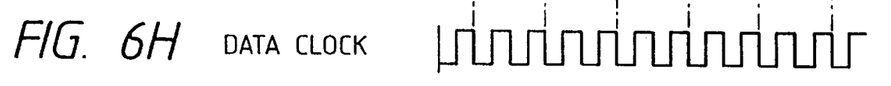
Figure 6I:
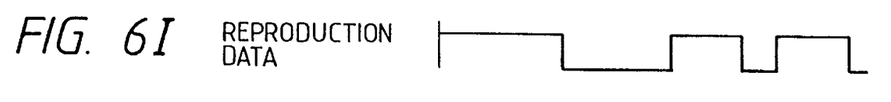
Figure 7:
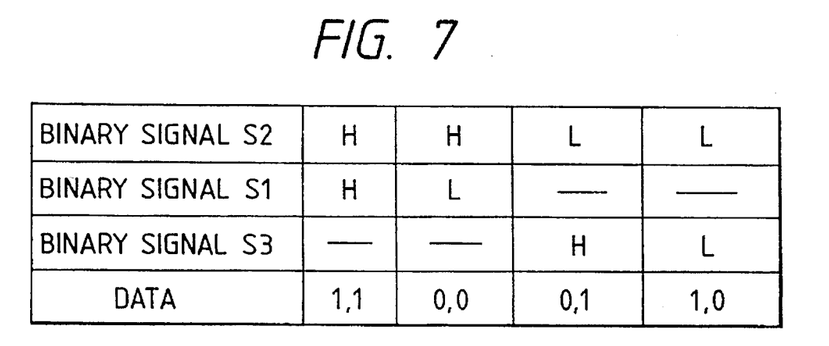
FIG. 7 is a drawing to show a correlation between binary signals S1 to S3 and recording data.

As described above, there is a correlation between the recording data and the binary signals S1 to S3 in two bit units of the recording data, so that the data determination circuit 7 can determine the data, based on the correlation, to produce the reproduction data. In more detail, as shown in FIGS. 6A to 6I, the data determination circuit 7 makes such a determination that if the binary signal S2 is at the high level and the binary signal S1 at the high level, the recording data is "1, 1" or that if the binary signal S2 is at the high level but the binary signal S1 is at the low level, the recording data is "0, 0." It is also determined that if the binary signal S2 is at the low level but the binary signal S3 is at the high level, the recording data is "0, 1" or that if the binary signal S2 is at the low level and the binary signal S3 at the low level, the recording data is "1, 0." FIG. 7 shows the results of the above determination of data using the binary signal S1 and the binary signal S1 or S3.

Describing in further detail, the binary signal S1, which is produced by binarizing the reproduction signal with the intermediate value of the amplitude, is a signal indicating that the recording data is "1, 1" or "0, 0" as apparent from FIGS. 6A to 6I. Also, the binary signal S3, which is produced by binarizing the differential signal of the reproduction signal with the intermediate value of the amplitude, is a signal indicating that the recording data is "0, 1" or "1, 0." Further, the binary signal S2, which is produced by the two comparators and ExNOR circuit as described previously, is a signal taking the high level with the recording data of two or more continuous bits of "1" or "0" but the low level with the recording data of "1, 0" or "0, 1." Thus, the recording data is either "1" or "0" with the binary signal S2 being at the high level, and then whether the recording data is "1" or "0" is determined in comparison with the binary signal S1. Also, the recording data is either "1, 0" or "0, 1" with the binary signal S2 being at the low level, and then whether the recording data is "1, 0" or "0, 1" is determined in comparison with the binary signal S3.

Figure 8:
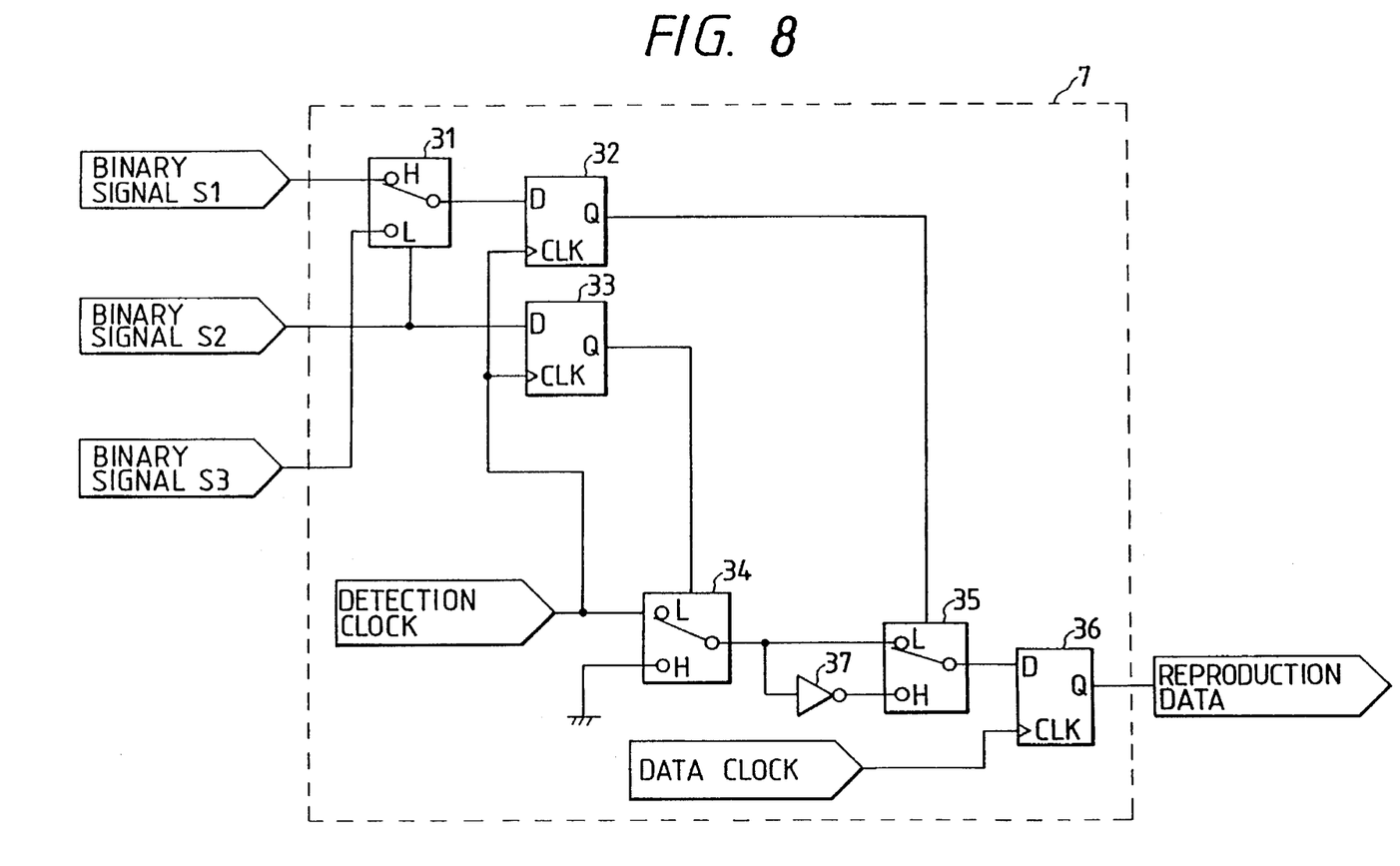
FIG. 8 is a circuit diagram to show a specific example of a data determination circuit 7 in the embodiment of FIG. 3.

FIG. 8 is a circuit diagram to show the structure of a specific circuit for the data determination circuit 7. In FIG. 8, the binary signal S2 is put into a D terminal of a D-type flip-flop 33 and then is output to a control terminal of a multiplexer 34 in synchronization with a detection clock as shown in FIG. 6G. The detection clock is a clock signal with a period which is double of that of the data clock for synchronization of the reproduction data as shown in FIG. 6H.

The binary signals S1 and S3 are put into a multiplexer 31, where either the binary signal S1 or S3 is selected based on the binary signal S2 put into a control terminal thereof. If the binary signal S2 is at the high level, the binary signal S1 is selected; if the binary signal S2 is at the low level, the binary signal S3 is selected. The thus selected signal is put into a D terminal of a D-type flip-flop 32. The signal selected by the multiplexer 31 is synchronized with the detection clock in the flip-flop 32 to be output to a control terminal of a multiplexer 35.

In the multiplexer 34 either the detection clock or the ground level is selected based on an output signal from the flip-flop 33. Namely, based on the binary signal S2 synchronized with the detection clock, the ground level is selected if it is at the high level, while the detection clock is selected if it is at the low level, whereby it is determined that the data is either "0, 0" or "1, 1" or that the data is either "1, 0" or "0, 1." An output signal from the multiplexer 34 and an inverted signal by an inversion gate 37 are output to the multiplexer 35, where either signal is selected based on the control signal from the flip-flop 32 as described previously.

Accordingly, the multiplexer 35 determines whether the data is "1, 1" or "0, 1" or that the data is "0, 0" or "1, 0," and outputs the result to a D terminal of a D-type flip-flop 36. The data clock shown in FIG. 6H is put into a CLK terminal of the flip-flop 36, and the data determined by the flip-flop 36 is output in synchronization with the data clock. This data is output as the reproduction data as shown in FIG. 6I. The data is thus determined in two bit units based on the binary signals S1 to S3 as described in FIG. 7, and the reproduction data is produced as shown in FIG. 6I by detecting the data with the detection clock of the period corresponding to the two bits.

The present embodiment is so arranged as to produce the binary signal S1 indicating that the recording data is either "0, 0" or "1, 1," the binary signal S3 indicating that the recording data is either "0, 1" or "1, 0," and the binary signal S2 changing the binary levels one for the recording data of "0, 0" or "1, 1" and the other for the recording data of "0, 1" or "1, 0" and as to judge the data in two bit units, based on the three binary signals, whereby the data can be detected with the detection clock of a frequency which is half that of the data clock, as shown in FIG. 6G. Therefore, even if the recording density or the transfer rate of information is doubled, for example, the frequency of the detection clock does not have to be doubled, which does not narrow the width of the detection window, enabling suppression of an increase in error rate.

Figure 9:
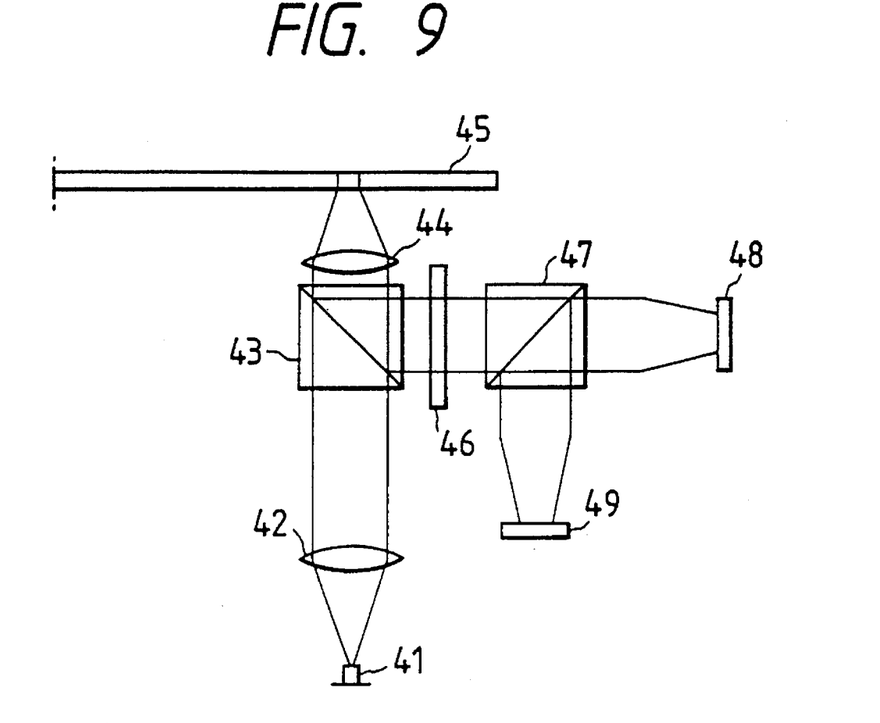
FIG. 9 is a drawing to schematically show the structure of an optical system in a magnetooptical recording apparatus.

Another embodiment of the present invention is next described. The present embodiment shows an example in which the present invention is applied to a magnetooptical recording and/or reproducing apparatus. FIG. 9 is a structural drawing to show an optical system in the magnetooptical recording and/or reproducing apparatus. In FIG. 9, reference numeral 41 designates a semiconductor laser provided as a light source. A laser beam emitted from the semiconductor laser 41 is collimated by a collimator lens 42 and thereafter the collimated beam passes through a polarization beam splitter 43 to enter an objective lens 44. Then, the objective lens 44 condenses the optical beam to form a micro light spot on a magnetooptical recording medium 45. Reflected light, subject to the Kerr effect in the recording medium 45, again passes through the objective lens 44 to become a beam of parallel rays. The parallel beam is reflected by the polarization beam splitter 43 to be guided through a quarter wave plate 46 to a polarization beam splitter 47. The polarization beam splitter 47 separates the beam into two light beams depending upon the polarization characteristics thereof, which are detected by optical sensors 48, 49, respectively. The quarter wave plate is so set as to have such an optical axis that the direction of polarization of polarized light from the polarization beam splitter 43 is rotated about 45°.

Figure 10:
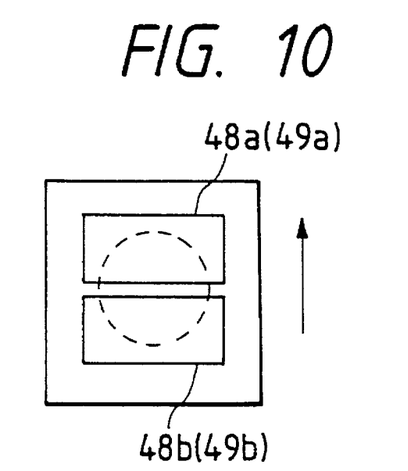
FIG. 10 is a plan view to show an optical sensor in the optical system of FIG. 9.
Figure 11:
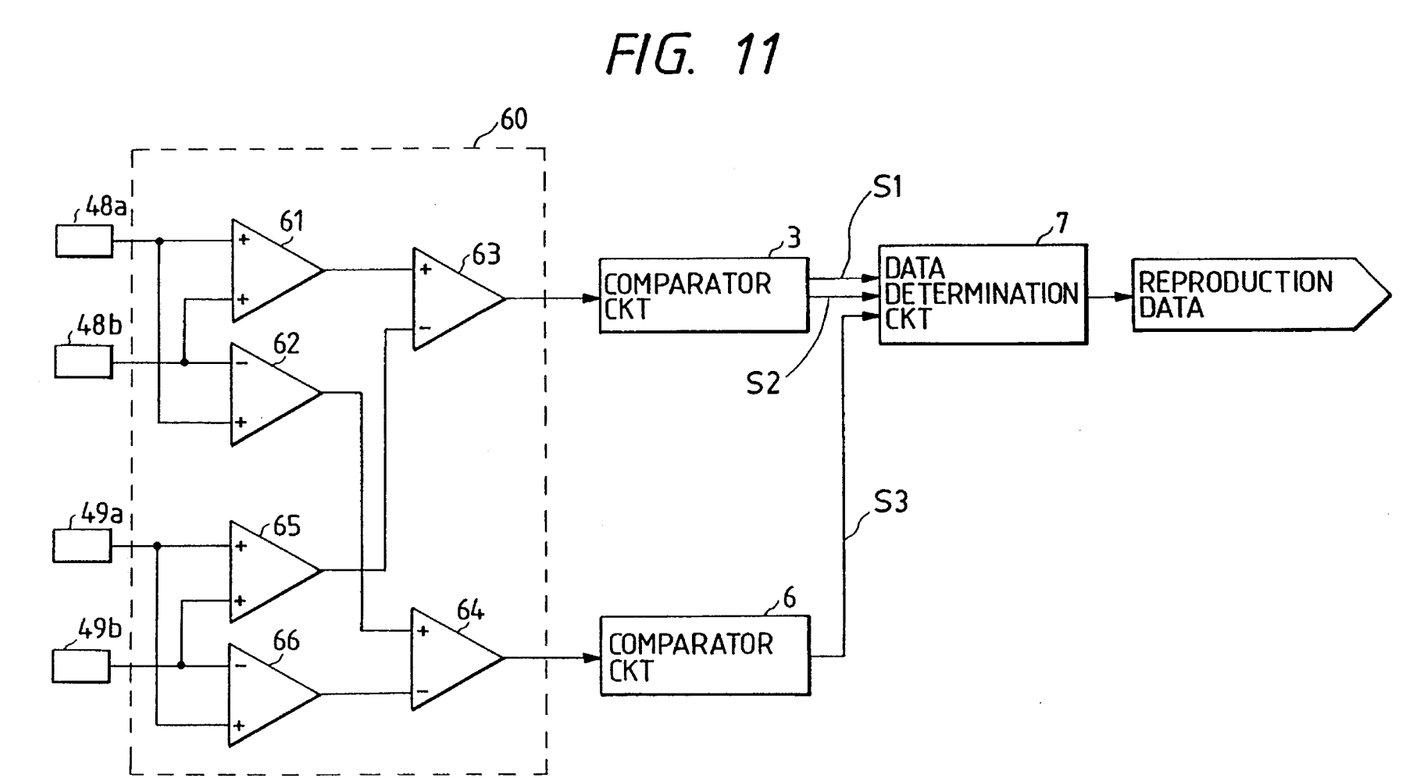
FIG. 11 is a circuit diagram to show another embodiment of the present invention.

The optical sensors 48 and 49 each are divided into two detection segments 48a, 48b and into two detection segments 49a, 49b, respectively, in a direction perpendicular to the track direction of the recording medium 45, as shown in FIG. 10. Performing predetermined analog calculation processes with detection signals from the respective detection segments, a magnetooptical signal and a differential signal obtained by differentiating it are produced. FIG. 11 is a circuit diagram to show an information reproducing apparatus in the above magnetooptical recording apparatus. In FIG. 11, 48a, 48b and 49a, 49b are the detection segments of the optical sensors 48 and 49 shown in FIG. 9, and 60 a reproduction circuit for producing the reproduction signal and the differential signal by performing the predetermined analog calculation processes based on the detection signals from these detection segments. Addition amplifiers 61 and 65 sum up the detection signals from the detection segments 48a and 48b in the optical sensor 48 and the detection signals from the detection segments 49a and 49b in the optical sensor 49, respectively. Further, the thus obtained addition signals are subjected to differential detection in a differential amplifier 63 to produce the magnetooptical signal. The magnetooptical signal is a signal corresponding to the reproduction signal in the embodiment of FIG. 3.

In addition, the detection signals from the detection segments 48a and 48b in the optical sensor 48 and the detection signals from the detection segments 49a and 49b in the optical sensor 49 are subjected to differential detection in differential amplifiers 62 and 66, respectively. Further, differential detection signals obtained are subjected to differential detection in a differential amplifier 64 to produce a differential signal of the magnetooptical signal. This signal is a signal corresponding to the differential signal which is the output from the differentiating circuit 4 in the embodiment of FIG. 3. The magnetooptical signal obtained in the differential amplifier 63 is output to comparator circuit 3 while the differential signal obtained in the differential amplifier 64 to comparator circuit 6, producing the binary signals S1 to S3 as described previously. The comparator circuits 3 and 6 are the same as those shown in FIG. 4 and FIG. 5, so that the comparator circuit 3 produces the binary signals S1 and S2 while the comparator circuit 6 the binary signal S3. The binary signals S1, S2, S3 are output to a data determination circuit 7. The data determination circuit 7 is also the same as that shown in FIG. 8, which determines the data based on the correlation between the binary signals S1 to S3 and the recording data as described previously to produce reproduction data. As described, the present embodiment can also enjoy the same effect as in the embodiment of FIG. 3 by producing the magnetooptical signal and the differential signal thereof, producing the binary signals S1 to S3 by the comparator circuits 3 and 6, and determining the data, based on the binary signals.

It is of course apparent that the present invention can be applied to any information reproducing apparatus for reproducing digital information as well as the magnetooptical recording and/or reproducing apparatus as shown in FIG. 9.

As detailed above, the present invention has such effects that the width of the detection window is not narrowed and that the decrease in error rate can be prevented even with highly increased recording density or transfer rate of information, because of the determination of the recording data in multiple bit units.

What is claimed is:

1. An information reproducing apparatus for reproducing digital information recorded in a recording medium, said apparatus comprising:

first binarizing means for binarizing a reproduction signal read out of the recording medium;

differentiating means for differentiating the reproduction signal read out of the recording medium;

second binarizing means for binarizing a signal obtained by differentiating the reproduction signal in said differentiating means;

third binarizing means for producing a binary signal indicating a high level and a low level when the digital information includes two or more continuous bits of "1" or "0" and when the digital information includes "1, 0" or "0, 1"; and determining means for determining the digital information in multiple bit units, based on output signals from said first, second and third binarizing means, wherein an output signal from said third binarizing means is compared with an output signal from one of said first and second binarizing means, to determine the digital information in multiple bit units.

2. An information reproducing apparatus for reproducing digital information recorded in a recording medium, said apparatus comprising:

first binarizing means for binarizing a reproduction signal read out by the recording medium, said first binarizing means comprising: (i) first comparing means for comparing the reproduction signal with a first predetermined level; (ii) second comparing means for comparing the reproduction signal with a second predetermined level higher than the first predetermined level; (iii) third comparing means for comparing the reproduction signal with a third predetermined level lower than the first predetermined level; and (iv) calculating means for taking an exclusive OR between outputs from said second and third comparing means;

differentiating means for differentiating the reproduction signal read out of the recording medium;

second binarizing means for binarizing a signal obtained by differentiating the reproduction signal in said differentiating means; and determining means for determining said digital information in multiple bit units, based on output signals from said first and second binarizing means.

3. An information reproducing apparatus according to claim 1, further comprising delay means for matching a timing of the reproduction signal with a timing of the signal obtained by differentiating the reproduction signal in said differentiating means.

4. An information reproducing method for reproducing digital information recorded in a recording medium, said method comprising:

a first binarizing step of binarizing a reproduction signal read out by the recording medium;

a step of differentiating the reproduction signal read out of the recording medium;

a second binarizing step of binarizing a signal obtained by differentiating the reproduction signal;

a third binarizing step of producing a binary signal indicating a high level and a low level when the digital information includes two or more continuous bits of "1" or "0" and when the digital information includes "1, 0" or "0, 1"; and a step of determining the digital information in multiple bit units, based on the signals produced in said first, second and third binarizing steps, wherein said determining step is arranged to determine the digital information in multiple bit units by comparing a signal produced in said third binarizing step with the signal produced in one of said first and second binarizing steps.

5. An information reproducing method according to claim 4, further comprising a step of delaying at least one of the reproduction signal and the signal obtained by differentiating the reproduction signal in order to match a timing of the reproduction signal with a timing of the signal obtained by differentiating the reproduction signal.

6. An information reproducing apparatus comprising:

light irradiating means for irradiating a recording medium with light;

detecting means for detecting light from the medium;

signal producing means for producing a reproduction signal and a differential signal obtained by differentiating the reproduction signal, based on an output from said detecting means;

first binarizing means for binarizing the reproduction signal, said first binarizing means comprising: (i) first comparing means for comparing the reproduction signal with a first predetermined level; (ii) second comparing means for comparing the reproduction signal with a second predetermined level higher khan the first predetermined level; (iii) third comparing means for comparing the reproduction signal with a third predetermined level lower than the first predetermined level; and (iv) calculating means for taking an exclusive OR between outputs from said second and third comparing means;

second binarizing means for binarizing the differential signal; and determining means for determining digital information in multiple bit units, based on output signals from said first and second binarizing means, wherein said determining means compares an output from said calculating means with one of the output from said second binarizing means and an output from said first comparing means.

7. An information reproducing apparatus according to claim 6, wherein said determining means comprises detection clock generating means for generating a reference clock for the determined digital information in multiple bit units, and data clock generating means for generating a reference clock for reproduction of the digital information, and wherein the clock generated by said detection clock generating means has a frequency which is approximately half that of a frequency of the clock generated by said data clock generating means.

8. An information reproducing apparatus according to claim 2, further comprising delay means for matching a timing of the reproduction signal with a timing of the signal obtained by differentiating the reproduction signal in said differentiating means.

* * * * *

UNITED STATES PATENT AND TRADEMARK OFFICE
CERTIFICATE OF CORRECTION

PATENT NO. : 5,563,863
DATED : October 8, 1996
INVENTOR(S) : MAKOTO HIRAMATSU

It is certified that error appears in the above-indentified patent and that said Letters Patent is hereby corrected as shown below:

COLUMN 4

Line 34, "S3 at" should read --S3 is at--.
Line 65, "of" (first occurrence) should be deleted.

COLUMN 5

Line 22, "that" should be deleted.

COLUMN 6

Line 47, "6 the binary" should read --6 produces the binary--.

COLUMN 8

Line 33, "khan" should read --than--.

Signed and Sealed this

Eighteenth Day of March, 1997

Attest:

BRUCE LEHMAN

Attesting Officer

Commissioner of Patents and Trademarks